United States Patent
Borsdorf et al.

(10) Patent No.: US 10,832,421 B2
(45) Date of Patent: Nov. 10, 2020

(54) DETERMINING A REGISTRATION BETWEEN A 3D IMAGE AND A SET OF AT LEAST TWO 2D IMAGES

(71) Applicant: Siemens Healthcare GmbH, Erlangen (DE)

(72) Inventors: Anja Borsdorf, Adesdorf (DE); Roman Schaffert, Erlangen (DE); Jian Wang, Forchheim (DE)

(73) Assignee: Siemens Healthcare GmbH, Erlangen (DE)

( * ) Notice: Subject to any disclaimer, the term of this patent is extended or adjusted under 35 U.S.C. 154(b) by 46 days.

(21) Appl. No.: 15/998,597

(22) Filed: Aug. 15, 2018

(65) Prior Publication Data
US 2019/0057510 A1 Feb. 21, 2019

(30) Foreign Application Priority Data

Aug. 15, 2017 (EP) ..................................... 17186273

(51) Int. Cl.
*G06T 7/33* (2017.01)

(52) U.S. Cl.
CPC ................ *G06T 7/337* (2017.01); *G06T 7/33* (2017.01); *G06T 2207/10081* (2013.01); *G06T 2207/10088* (2013.01); *G06T 2207/10116* (2013.01); *G06T 2207/30008* (2013.01)

(58) Field of Classification Search
CPC . G06T 2207/10081; G06T 2207/10088; G06T 7/337; G06T 7/33
See application file for complete search history.

(56) References Cited

U.S. PATENT DOCUMENTS

| 6,317,619 | B1 * | 11/2001 | Boernert | G01R 33/341 324/307 |
| 7,327,865 | B2 * | 2/2008 | Fu | G06K 9/32 378/28 |
| 9,549,710 | B2 | 1/2017 | Borsdorf | |

(Continued)

FOREIGN PATENT DOCUMENTS

DE 102015208929 B3 6/2016
DE 102013214479 B4 4/2017

OTHER PUBLICATIONS

European Search Report for European Patent Application No. 17186273.3-1906 dated Oct. 27, 2017.

(Continued)

*Primary Examiner* — John J Lee
(74) *Attorney, Agent, or Firm* — Lempia Summerfield Katz LLC (57) ABSTRACT

A method for determining or updating a registration between a 3D image of a region of interest and a set of at least two 2D images of the same region of interest includes selecting at least one respective contour point in the 3D image for each 2D image. A 2D position of a respective depiction of each contour point is determined in the respective 2D image. At least one condition for the registration parameters that needs to be fulfilled is determined, for each contour point, to map the respective contour point to the respective 2D position in the respective 2D image. An updated set of registration parameters is determined by solving a set of equations or an optimization problem that depends on the conditions.

18 Claims, 2 Drawing Sheets

(56) References Cited

U.S. PATENT DOCUMENTS

2009/0180678 A1* 7/2009 Kuduvalli ............ A61N 5/1049
382/132
2016/0335777 A1 11/2016 Borsdorf
2017/0243361 A1* 8/2017 Schaffert ................ G06T 7/564

OTHER PUBLICATIONS

Ferrante, Enzo, and Nikos Paragios. "Slice-to-volume medical image registration: A survey." Medical image analysis 39 (2017): 101-123.
Markelj et al. "Robust gradient-based 3-D/2-D registration of CT and MR to X-ray images." IEEE Transactions on Medical Imaging 27.12 (2008): 1704-1714.
Wang, Jian, et al. "Dynamic 2-D/3-D Rigid Registration Framework Using Point-To-Plane Correspondence Model." IEEE transactions on medical imaging 36.9 (2017): 1939-1954.
Wang, Jian, et al. "Gradient-based differential approach for 3-D motion compensation in interventional 2-D/3-D image fusion." 2014 2nd International Conference on 3D Vision. vol. 1. IEEE, 2014. pp. 293-300.
Gamage, P., et al. "Pose estimation of femur fracture segments for image guided orthopedic surgery." 2009 24th International Conference Image and Vision Computing New Zealand. IEEE, 2009. pp. 288-292.
European Office Action for European Application No. 17 186 2733-1210 dated May 13, 2020.
Ibáñez, Oscar, et al. "An experimental study on the applicability of evolutionary algorithms to craniofacial superimposition in forensic identification." Information Sciences 179.23 (2009): 3998-4028.

\* cited by examiner

DETERMINING A REGISTRATION BETWEEN A 3D IMAGE AND A SET OF AT LEAST TWO 2D IMAGES

This application claims the benefit of EP17186273.3, filed on Aug. 15, 2017, which is hereby incorporated by reference in its entirety.

BACKGROUND

The present embodiments relate to determining a registration between a three-dimensional (3D) image of a region of interest and a set of at least two two-dimensional (2D) images of the same region of interest.

In image-guided interventional procedures, C-arm systems are commonly used for real-time guidance. Preoperative volume images acquired by, for example, computer tomography or magnetic resonance imaging may be overlaid onto 2D fluoroscopic images. The 2D/3D registration may achieve a high initial accuracy and may also be updated to provide a high accuracy (e.g., in the case of patient motion).

A gradient based approach to 2D/3D registration is known, for example, from the article Markelj, P. et al., "Robust Gradient-Based 3-D/2-D Registration of CT and MR to X-Ray Images", IEEE TRANSACTIONS ON MEDICAL IMAGING, VOL. 27, NO. 12 (2008), P 1704. Each 2D intra interventional image is processed to obtain a corresponding 2D gradient field. The extracted gradients are then back projected into 3D. The registration is achieved by calculating a gradient of the 3D image to be registered and optimizing a transformation that minimizes the difference between that gradient field and the back projected gradients.

An alternate approach to 2D/3D registration is discussed in the document DE 10 2015 208 929 B3. This approach may achieve an initial registration as well as real-time tracking of patient movement based on a single 2D image. Features points corresponding to contours in the 2D image are extracted from the 3D image, and for each point, a corresponding position in the 2D image is searched using pattern matching. A 3D difference motion is computed by using all found correspondence to align the images. For the correspondences, a point-to-plane correspondence model is used to define a linear set of equations for the correspondences and solve the linear set of equations to obtain the motion. Similar approaches are also discussed in the paper Wang, J. et al., "Gradient-Based Differential Approach for 3-D Motion Compensation in International 2-D/3-D Image Fusion", 2014 Second International Conference on 3D Vision, DOI 10.1109/3D V.2014.45 and in the paper J. Wang, et al. "Dynamic 2-D/3-D Rigid Registration Framework Using Point-To-Plane Correspondence Model", IEEE TRANSACTIONS ON MEDICAL IMAGING, Vol. PP, Issue 99, DOI 10.1109/TMI.2017.2702100.

The approaches used for 2D/3D registration based on the point-to-plane correspondence model use only a single 2D image for tracking the three dimensional movement of an object (e.g., a patient). While this is advantageous when using these methods in the scope of fluoroscopy, there is always a certain loss of information when only using a single view when tracking a three dimensional motion. Since the point-to-plane correspondence depends on the imaging geometry used, these approaches are, however, limited to using a single imaging geometry or view. If 2D images acquired using multiple imaging geometries are to be used for the registration, alternate approaches like the previously discussed back projection based approach may be used. It may also be possible to separately determine a 2D/3D registration for each of the views by using a point-to-plane correspondence model for each view and then select an optimum registration from these registrations, or to only consider in plane movement for each view. While good accuracy may be reached for some scenarios with these approaches, performance and/or accuracy issues may arise in other scenarios.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved method for determining or updating a registration between a three-dimensional (3D) image and a set of at least two two-dimensional (2D) images acquired using different imaging geometries is provided.

A method for determining or updating a registration between a 3D image of a region of interest and a set of at least two 2D images of the same region of interest is provided. The 2D images are acquired using different imaging geometries. The registration is described by a set of registration parameters. The method includes selecting at least one respective contour point in the 3D image for each 2D image, and determining a 2D position of a respective depiction of each contour point in the respective 2D image. For each contour point, at least one condition for the registration parameters that needs to be fulfilled is determined to map the respective contour point to the respective 2D position in the respective 2D image. An updated set of registration parameters is determined by solving a set of equations or an optimization problem that depends on the conditions.

The method determines 2D positions of respective depictions of contour points previously chosen in the 3D image and uses the 2D positions to determine conditions for the registration parameters. These conditions may then be used to determine the registration parameters either by solving a set of equations or by solving an optimization problem. Therefore, a similar approach is used as in the previously discussed registration approaches using a point-to-plane correspondence model. Instead of considering the positions of depictions of contour points in a single 2D image, at least one respective contour point is selected for each 2D image and the respective 2D position of the respective depiction is determined in the respective 2D image. The conditions used to determine the registration parameters therefore depend on positions of respective contour points in different 2D images acquired using different imaging geometries. This may, for example, be achieved by defining the conditions in a common coordinate system or by transforming the conditions to such a coordinate system. This will be discussed in detail later.

The 2D images of the set may be acquired using different orientations and/or positions of the region of interest with respect to the sensors or detectors used to acquire the respective images and/or respective X-ray sources. For example, at least two different pairs of X-ray sources and X-ray detectors may be used to acquire images at an angle. Alternatively, the at least two 2D images of the set may be acquired at different times (e.g., by periodically moving a C-arm comprising an X-ray source and a detector between different acquisition positions and/or orientations to acquire the set of images).

The registration parameters may directly describe the position and/or orientation of an object including the region of interest. Additionally or alternatively, configuration parameters of this object may be described by the registration parameters (e.g., the relative orientation of two body parts of a patient).

The discussed method may be used in the context of medical imaging. The region of interest may be a region of a patient.

An initial set of registration parameters that gets updated by the method described above may be used. This may, for example, be the case when the method is used for updating an existing registration to compensate an especially small movement of the region of interest. It may also be useful to provide a rough initial registration that may, for example, be provided by a user of an X-ray device by roughly estimating the orientation and/or position of the region of interest with respect to a used detector or sensor for the respective 2D image. Providing an initial registration may be useful to speed up the conversion of the method and/or to improve the quality of the resulting registration. The initial registration may have an accuracy that is better than 5° or 10° or 20° concerning an angle of rotation of the region of interest with respect to a frame of reference and/or that is better than 10 mm, 20 mm or 30 mm concerning the translation with respect to the frame of reference.

The 3D image may include a multitude of voxels in each of the three image directions. The 3D image may, for example, be recorded by magnetic resonance imaging, computer tomography, or emission tomography. The 2D images may be X-ray images (e.g., fluoroscopy images).

By selecting contour points from the 3D image for each 2D image, a sparse input for the further calculations is provided. Candidates for the contour points may be chosen such that the points are part of a 3D contour (e.g., a 3D contour) of a rigid object like a bone (e.g., a cranial bone, a medical instrument such as a stent, or a marker). In one embodiment, the registration parameters may describe an orientation and position of the rigid object. Relevant regions including rigid objects may be identified by segmenting the 3D image. Prior information (e.g., an anatomical atlas) may be used in the process.

To choose points on a 3D contour, an edge detection (e.g., a canny edge detector) may be used. This method and other methods for edge detection are well known in the prior art and will not be discussed in detail. If the contour of an object in the 3D image is already known (e.g., by segmentation of the 3D image), points may directly be chosen on this contour (e.g., on a 3D mesh defining the contour).

The contour points may be chosen such that the gradient is high in the contour points and that the gradient is oriented perpendicular or close to perpendicular to the viewing direction of the imaging geometry of the respective 2D image. The angle of the gradient to the viewing direction may, for example, be smaller than 10° or 6°. If an initial registration is known and the initial registration registers previously recorded 2D images to the 3D image, the contour points may be selected in the previously recorded 2D images, and then, the respective voxel may be determined in the 3D image. This may, for example, be achieved by rendering gradient images for different depth layers, as discussed in DE 10 2013 214 479 B4, for a single imaging geometry. This approach may be used independently for the multiple imaging geometries used in the method discussed above.

Several approaches may be used to determine a 2D position of the respective depiction of each contour point in the respective 2D image. If prior images were acquired and a prior registration is known between the 3D image and the prior 2D images, the position of the respective depiction of each contour point in the prior 2D images may be calculated directly from the prior registration. The 2D position of a respective contour point in the current images may then be directly determined by using an algorithm for a two dimensional motion detection between one of the prior images and a respective current image. This motion detection may, for example, be performed by using an optical flow algorithm.

In one embodiment, an initial registration may be used to perform a forward projection of the 3D image or a data set derived from the 3D image, and this forward projection may be compared to the respective 2D image or a data set determined from the respective 2D image. In one embodiment, a 3D gradient image is calculated from the 3D image, projected forwarded, and compared to a gradient image of the respective 2D image. The misalignment may be measured by selecting a patch of the forward projected image and searching an equivalent patch in the 2D image or the data set determined from this image. The search may be directed in the direction of a gradient of the 2D or 3D image. The determined 2D offset may be added to an initial position of the contour point in the respective 2D image calculated by using the initial registration to determine the 2D position of the depiction of the respective contour point.

The conditions may be conditions for the 3D positions of the contour points in the respective 3D acquisition coordinates defined by the imaging geometries or in a common coordinate system. By changing the registration parameters, the 3D positions of the contour points change in the acquisition coordinates or in a common coordinate system. The 2D position of the depiction may be used to determine a plane in 3D space to which the 3D position of the contour point is limited. The conditions for the individual contour point may at first be defined separately. In one embodiment, the conditions for the different imaging geometries may be separately determined, and therefore, the same approach may be used to determine the conditions that are used in the point-to-plane correspondence model.

The imaging geometries may be defined or approximated by a respective central projection, where the registration parameters define a position and an orientation of the region of interest relative to the center of projection and to the plane of projection for each imaging geometry and therefore the 3D positions of each contour point relative to the centers and planes of projection. The 2D position of the depiction of the respective contour point may define the position of the depiction in the respective plane of projection. The condition may limit the possible 3D positions of the respective contour point to a respective bounding plane that includes the center of projection for the imaging geometry of the respective 2D image and the position of the depiction of the respective contour point in the projection plane of that imaging geometry.

To determine the last free parameter of the bounding plane, an initial set of registration parameters may be used. As discussed previously, these may, for example, be known from a prior registration and/or may be roughly estimated. Especially when using an iterative determination of the registration parameters, as discussed later, relatively large errors may be tolerated in the initial registration.

An initial position and orientation of the 3D image relative to the centers and planes of projection may be defined by an initial set of registration parameters, where a direction of the gradient of the 3D image at the respective 3D position of the contour point in the 3D image is determined. The bounding plane is orthogonal to the respective gradient.

The previously discussed conditions may be chosen, since a movement of the contour point between successive 2D images acquired with the same imaging geometry may only be observed if the movement of the contour point has a component in the direction of the gradient in the 3D mage and in the 2D image. The movement may also not be observed if the movement is directed in the imaging direction of the respective pixel. A movement of the contour point out of a respective bounding plane may be observed, but a movement within the bounding plane may not be discerned without acquiring 2D images with other imaging geometries or using additional boundary conditions (e.g., that different contour points are located on a rigid object and therefore have a fixed spatial relationship).

Since the method of one or more of the present embodiments determines respective conditions for a plurality of contour points (e.g., for contour points of a single rigid object or an object that limits the degrees of freedom of movement of the individual contour points), the overall movement of the object and therefore the registration parameters may be determined when a sufficient amount of contour points is considered.

A possible derivation of the conditions and therefore the set of equations or the optimization problem to be solved will be shortly described for a single imaging geometry first. In a single imaging geometry, a coordinate system that has an origin in the center of projection of the imaging geometry may be used. This may, for example, be the position of a point source when an X-ray image is used as the 2D image. The 3D position of contour points according to an initial registration may be described by the vector $w_i$. The real position of the contour point may then be written as the sum of the vector $w_i$ and an offset $dw_i$ that describes the error of the initial registration and/or a movement of the respective contour point since the determination of that initial registration. As previously described, the contour point is depicted in the respective 2D position of the respective 2D image if the position of the point $w_i + dw_i$ is on the bounding plane $P_i$, and therefore, the distance d between the bounding plane $P_i$ and the contour point is zero:

$$d(P_i; w_i + dw_i) = 0 \qquad (1)$$

Since the bounding plane includes the origin of the coordinate system, this condition may be rewritten as:

$$n^t(w + dw) = 0,$$

with n being the normal vector of the bounding plane P. The subscript i that refers to the respective contour point is dropped for simplicity for now.

Given the conditions for the bounding plane P discussed above, the normal vector n of the bounding plane P may be written as:

$$n = \frac{(w \times g) \times p'}{\|(w \times g) \times p'\|}, \qquad (3)$$

with g being the respective gradient of the 3D image at the position w, and p' being the position of the depiction of the respective contour point in the projection plane. If all considered contour points are located on a rigid object and the degrees of freedom are therefore limited to a rotation and a translation of that object, and if a relatively small error of rotation between an initial registration and the resulting registration is expected, a linear approximation may be used for the offset vector dw of the 3D position.

$$dw = d\omega \times w + dt, \qquad (4)$$

where $d\omega$ is a vector pointed along an axis of rotation having a value that depends on the angle of rotation of the object, and dt is the translation vector for the object. This equation may be rewritten as a vector equation for the registration parameters $d\omega$ and $dt$:

$$\begin{pmatrix} n \times w \\ -n \end{pmatrix}^t \begin{pmatrix} d\omega \\ dt \end{pmatrix} = n^t w \qquad (5)$$

While this equation has several solutions when only one contour point is considered, by using a sufficient number of contour points, a unique solution of this equation may be found.

If a large number of contour points is used, the above equation will be over-determined. Therefore, it is often not possible and/or desirable to find an exact solution for that equation. Instead, an optimization problem may be solved to find an optimum solution for the set of equations. This is well known in the prior art and will not be discussed in detail.

The drawback of the previously discussed formulation of the conditions is that the resulting set of equations or optimization problem is limited to one imaging geometry, since the registration parameters dw and dt are calculated within a coordinate system defined by the imaging geometry. If a joint solution for a resulting set of registration parameters is to be found for a set of equations or an optimization problem that depends on conditions determined from at least two 2D images acquired using different imaging geometries, this approach is to be modified.

It is possible that the conditions are conditions for the 3D positions of the contour points in a common coordinate system. As shown later, this also allows for the determination of a resulting set of registration parameters in this common coordinate system and, therefore, of a joint solution of the set of equations or the optimization problem, even if the conditions are determined from at least 2D images with different imaging geometries. The common coordinate system may, for example, be defined by one of the imaging geometries. A cartesian coordinate system with an origin in the center of projection of that imaging geometry and/or with a coordinate axis that is orthogonal to the plane of projection for that imaging geometry may be used.

At least one condition may be determined by generating an initial condition for a 3D position of the respective contour point in an initial coordinate system and transforming that condition to the common coordinate system. The initial coordinate system may be rotated and/or translated with respect to the common coordinate system. The transformation between the coordinate systems may be a rigid transformation and is therefore not changing the distances between planes and points. With the transformation of the vectors and planes labeled by the transformation function T, equation (1) may be rewritten:

$$d(P_i; w_i + dw_i) = d(T(P_i); T(w_i) + T(dw_i)) = 0. \qquad (6)$$

Equation (2) may therefore be transformed as follows:

$$n_{i,T}^t(w_{i,T} + T(dw_i)) - n_{i,T}^t \cdot o_T = 0, \qquad (7)$$

where $n_{i,T}$ is the transformation of the normal vector n given by equation (3), $w_{i,T}$ is the transformation of the vector w, and $o_T$ is the position of the origin of the initial coordinate system in the common coordinate system. The linear approximation previously discussed with respect to equation (4) may also be applied in the common coordinate system. Therefore, the transformed vector $dw_i$ may be approximated as:

$$T(dw_i)=d\omega_{i,T} \times w_{i,T}+dt_T, \quad (8)$$

where $dw_{i,T}$ is a vector pointing in the direction of the axis of rotation of the object or the region of interest in the common coordinate system that has a value depending on the rotation angle, and $dt_T$ is the translation vector of the object or the region of interest in the common coordinate system.

Combining equations (7) and (8) and rearranging the equation, the condition may be written as:

$$n_{i,T}^t dt_T - n_{i,T}^t (w_{i,T} \times d\omega_T) = n_{i,T}^t \cdot (o_T - w_{i,T}). \quad (9)$$

By exploiting that the second term on the left hand side of equation (9) is a scalar and the term may therefore be transposed without changing the value and using the properties of the vector product, equation (9) may be written as:

$$n_{i,T}^t dt_T - d\omega_T^t (w_{i,T} \times n_{i,T}) = n_{i,T}^t \cdot (o_T - w_{i,T}) \quad (10)$$

By rearranging this equation as a vector equation, as discussed with respect to equation (5), for each contour point, the following set of equation may be given as:

$$\begin{pmatrix} n_{i,T} \times w_{i,T} \\ -n_{i,T} \end{pmatrix}^t \begin{pmatrix} d\omega_T \\ dt_T \end{pmatrix} = n_{i,T}^t (w_{i,T} - o_T). \quad (11)$$

The equation (11) has the same structure as equation (5). Since the common coordinate system is used, conditions determined from 2D images that are acquired using different imaging geometries may easily be combined simply by transforming the respective vectors $n_i$ and $w_i$ determined for that contour point in an initial coordinate system defined by the imaging conditions to a common coordinate system. The registration parameters $d\omega_T$ and $dt_T$ may therefore be determined conjointly for the contour points chosen for different 2D images.

The initial coordinate system and the common coordinate system may be defined by the imaging geometries for different 2D images. The common coordinate system and/or the initial coordinate system may be cartesian coordinate systems. The respective origins may be defined by the respective center of projection, and/or one of the respective coordinate axes may be orthogonal to the image plane in the respective imaging geometry. The transformation matrix between these coordinate systems may be calculated by multiplying a matrix for the extrinsic camera parameters defining the imaging geometry for the common coordinate system with the inverted respective matrix for the initial coordinate system. Such matrices defining extrinsic camera parameters of imaging geometries are known in the prior art and may, for example, be defined by a four by four matrix that contains a three by three rotation matrix in the top left corner and a translation vector in the first three rows of the last column. The final row is zero for all entries except the last column, where the value is one.

As discussed before, it is advantageous to use a linear approximation for the rotation in the method of one or more of the present embodiments. This approximation introduces errors for the position of the contour point. For a pure rotation, the errors may be derived by calculating an exact rotation for a vector $w_i$, subtracting the approximation, and calculating the norm. This error may be calculated as:

$$\|w_i\| \cdot \sin(\beta) \cdot \sqrt{(\cos(\alpha)-1)^2+(\sin(\alpha)-\alpha)^2},$$

where $\alpha$ is the angle of the approximated rotation and $\beta$ is the angle between the axis of rotation and the vector $w_i$. The errors introduced by the linear approximation may therefore be minimized by choosing a common coordinate system that minimizes the absolute values of the $w_i$.

It is therefore advantageous if the origin of the common coordinate system is the geometric center of the 3D positions of the contour points. A common coordinate system with an origin at the centroid of the points $w_i$ may therefore be chosen.

As previously discussed, the set of equations or the optimization problem may be over-determined if a sufficient amount of contour points is chosen. In this case, regression analysis may be used to determine the updated set of registration parameters by minimizing a loss function. Since the widely used approach to minimize the sum of the squares of the errors of the fitted model is highly sensitive to outliers, a robust regression, for example, is used. Various possible algorithms for a robust regression are known in the prior art. In one embodiment, the Maximum Correntropy Criterion for Regression (MCCR) is used, but the least absolute deviation regression (LADR) or iteratively reweighted least squares (IRLS) may also be used. These approaches are, for example, discussed in the previously cited paper "Dynamic 2-D/3-D Rigid Registration Framework Using Point-To-Plane Correspondence Model" by J. Wang, et al. and the references cited therein.

Instead of considering all conditions, a random sample consensus (RANSAC) algorithm may be used to determine a subset of conditions and respective contour points to be used in the determination of the resulting set of registration parameters. This algorithm is well known and is therefore not described in detail. The core idea is to select a subset (e.g., a minimum subset) of conditions, determine temporary registration parameters for this subset, and calculate a measure of error for each condition when using the temporary registration parameters. If the error is smaller than a given threshold, the respective condition and therefore the contour point for which this condition is derived is considered to be an inlier. If the error is too large, the condition and therefore the contour point is considered to be an outlier. If a sufficient number of conditions or contour points are considered to be inliers for a certain temporary set of registration parameters, those inliers may then be used in the determination of the resulting set of registration parameters. If after a certain amount of iterations none of the determined sets of inliers is sufficiently large, the largest determined set of inliers may be used for determining the resulting set of registration parameters. By using a RANSAC-algorithm outliers (e.g., points that were wrongly identified as contour points or for which a wrong 2D position was determined) may be excluded from the calculation of the resulting set of registration parameters.

The registration parameters may define a rigid rotation and/or translation of the region of interest with respect to a given frame of reference. The frame of reference may be defined with respect to an imaging device used to acquire the 2D images of the set. Alternatively, the reference may be defined with respect to the imaging geometry of one of the 2D images of the set.

At least one of the conditions may depend on a relative rotation between the orientation of the region of interest according to the set of registration parameters or an initial set of registration parameters and according to the resulting set of registration parameters, where a linear approximation for this relative rotation is used in the condition. As shown before, this may result in a set of conditions that may be written as linear equations. This is advantageous since efficient approaches to finding optimal solutions of sets of linear equations are well known. Therefore, an efficient implementation of the method may be provided.

At least one of the 2D images of the set may be an X-ray image, and/or the 3D image may be a magnetic resonance image or a computer tomography image. The X-ray image may be acquired during a fluoroscopy.

At least one prior set of prior 2D images may be used, where the set of registration parameters or an initial set of registration parameters describes the registration of the 3D image to the prior 2D images. The resulting registration parameters depend on the initial set of registration parameters and the prior 2D images. The initial registration may be determined by a prior execution of the previously described method or the initial registration may be estimated as discussed previously.

The use of prior images and a prior registration may be used for selecting the contour points. As previously discussed, the contour points may be selected in the prior 2D images, and respective contour points in the 3D image may be found using an initial registration.

Additionally or alternatively, the prior images and registration may be used to determine the relative 2D position by performing 2D motion detection between a prior image and a respective current image, as previously discussed.

The determination of the 2D position of the respective depiction of each contour point may depend on the set of registration parameters or an initial set of registration parameters. This determination is repeated with the resulting set of registration parameters to determine respective updated 2D positions for the depictions, and a further resulting set of registration parameters is determined in dependence of the updated 2D positions. Therefore, an iterative approach may be used to determine the registration parameters that may result in an improved registration. The iteration may proceed until a conversion condition is fulfilled (e.g., until the change of the determined 2D positions between iterations drops below a threshold), and/or the iteration may be stopped once a maximum number of repetitions is reached.

This iterative solution may, for example, be advantageous if a forward projection of the 3D image or a data set determined from the 3D image (e.g., a 3D gradient image) is used for determining the 2D position, as discussed above. Since the currently used registration parameters will approach the correct registration parameters with each iteration, the surroundings of a contour point in the forward projected image will be a better approximation for the respective sections of the 2D image or the data set derived from that.

In one embodiment, a processing unit (e.g., a processing unit of an X-ray device) configured to perform the method according to one or more of the present embodiments is provided. The X-ray device may be used to record the 2D images of the set or at least one of the 2D images.

In one embodiment, a computer program that may be directly loaded into a memory unit of a processing unit (e.g., a processing unit of an X-ray device) is provided. The computer program includes instructions for performing the acts of the method according to one or more of the present embodiments when the program is executed on the processing unit.

Additionally, in one embodiment, a computer-readable storage medium (e.g., a non-transitory computer-readable storage medium) containing electronically readable instructions (e.g., including the computer program) executable by one or more processors is provided.

DETAILED DESCRIPTION

Figure 1:
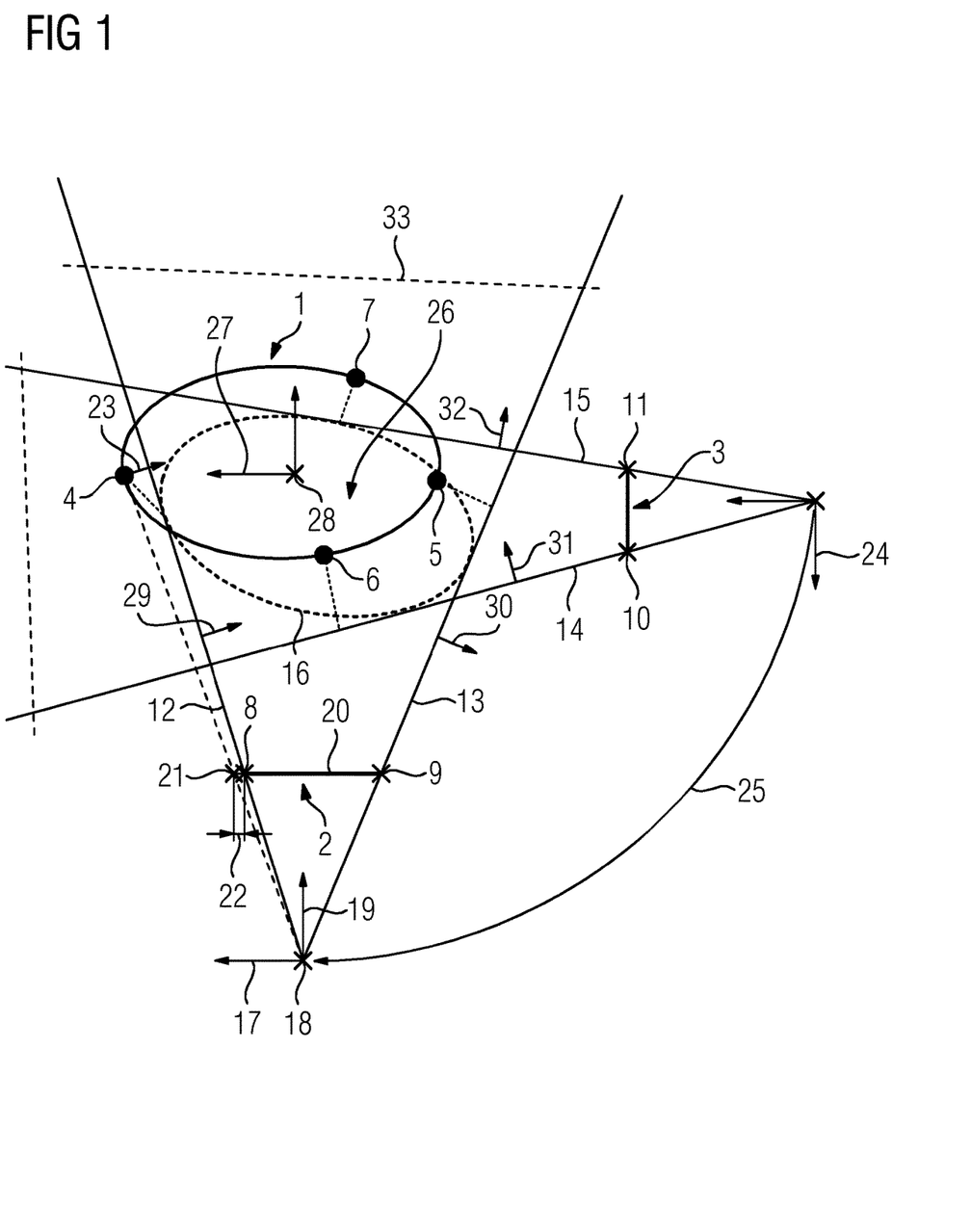
FIG. 1 illustrates an embodiment of a method.

A method for updating a registration between a three-dimensional (3D) image 1 and a set of two two-dimensional (2D) images 2, 3 is described with respect to FIG. 1. For reasons of clarity, all features are shown in a plane. However, the discussed acts are also applicable when some of the shown features are offset orthogonally to the image plane. The 3D image 1 may, for example, be a magnetic resonance tomography or a computer tomography image. Schematically, only an ellipse is shown as the 3D image. In real world applications, the used 3D image data may be more complex. Both the 3D image 1 and the 2D images 2, 3 show the same region of interest 26.

An initial registration that describes the orientation and position of the region of interest 26 with respect to the imaging geometries used is provided. The 3D image 1 is shown in the position and orientation described by the initial registration. If the region of interest 26 moves (e.g., due to a movement of a patient in medical imaging), the registration may be updated to show the correct position 16 of the 3D image with respect to the imaging geometries and therefore with respect to the projection planes 20 of the 2D images 2, 3.

To update parameters describing the registration (e.g., a rotation and a translation of the region of interest 26 with respect to an imaging device), contour points 4-7 are selected in the 3D image 1. The contour points 4-7 may be selected by first determining rigid contours in the 3D image. Contours may be detected, for example, by a canny edge detector. By using prior information (e.g., an anatomical atlas), rigid structures may be identified. Individual points on the rigid contours are chosen. The chosen points may have strong image gradients in the 3D image 1 in a direction orthogonal to the viewing direction of the respective 2D image 2, 3 for which the respective contour point 4-7 is chosen.

For each of the contour points 4-7, a 2D position 8-11 is determined in the respective 2D image 2, 3. This will be discussed in more detail later. The determined 2D positions 8-11 are used to define bounding planes 12-15. The bounding planes 12-15 are chosen such that the contour points 4-7 are to be positioned within the bounding planes 12-15 to be depicted in the 2D positions 8-11. The bounding planes 12-15 are first defined in respective initial coordinate systems 17, 24 that are determined by the imaging geometries used to acquire the 2D images 2, 3. The coordinate system 17 is chosen such that an origin is the center of projection 18 and a coordinate axis 19 is orthogonal to the projection plane 20 of the respective imaging geometry. The bounding plane 12 is defined such that the bounding plane 12 includes the center of projection 18 for the 2D image 2 and the position 8 of the depiction of the contour point 4 in the plane of projection 20 for the 2D image 2. The orientation of the bounding plane 12 is chosen such that the orientation is orthogonal to the 3D gradient 23 of the 3D image 1 at the position of the contour point 4. These processes are repeated accordingly for the bounding planes 13, 14 and 15.

The position 8 of the depiction of the contour point 4 may be determined by calculating a 3D gradient image from the 3D image 1 and forward projecting the 3D gradient image to the plane of projection 20 for the 2D image 2. The gradient at the position of the contour point 4 is projected to the position 21. A surrounding of this position 21 (e.g., a block of eight by eight or sixteen by sixteen pixels) may be compared to respective blocks of a gradient image calculated from the 2D image 2 to define an offset 22 between the position 21 and the position 8. The search may, for example, run along a gradient in the forward projected image or in the gradient image calculated from the 2D image 2. Since the position 21 is known from the initial registration, the position 8 of the depiction of the contour point 4 may be calculated. This process may be repeated for the positions 9, 10 and 11.

The bounding planes 12-15 each define several conditions for the position of the respective contour point 4-7. Since the contour points 4-7 are part of a rigid structure, corresponding relative positions are also fixed. Therefore, a new position 16 for the 3D image 1 and therefore the registration parameters may be calculated. To achieve this, the conditions defined by the bounding planes 12-15 may be transformed to a common coordinate system. For example, the coordinate system 17 may be used as a common coordinate system. A respective transform is shown schematically by the arrow 25. As discussed with respect to equation (11), it is sufficient to transform the normal vectors 29, 30, 31, 32 and the respective vectors pointing to the initial 3D positions of the contour points 4-7 to the common coordinate system to allow for a calculation of registration parameters $d\omega_T$ and $dt_T$.

Since a linear approximation is used, errors of the registration parameters may be introduced (e.g., when the difference between the initial set of registration parameters and the resulting set of registration parameters is large). To minimize the resulting errors, the common coordinate system may be chosen such that the absolute values of the vectors of the contour points 4-7 are relatively small. This may be achieved by choosing the coordinate system 27 as the common coordinate system. The origin 28 of the coordinate system 27 is the geometric center of the 3D positions of the contour points 4-7.

The quality of the registration may be improved when the described method is repeated for several iteration steps. The resulting set of registration parameters is used in the next iteration as an initial set of registration parameters during the determination of the 2D positions 8-11.

If a sequence of images is recorded, it information provided by the prior images may be used. A simple example for the use of information of prior images is the use of a motion detection between sequentially recorded images to determine the offset 22 (e.g., by an optical flow method).

The projection plane 20 for the 2D images 2, 3 are shown on the same side of the region of interest 26 as a respective center of projection 18. This representation is typically used when describing a central projection. In the case of an acquisition of the 2D images by a cone beam X-ray device, the center of projection 18 may be identified with an approximately point shaped X-ray source, and the detector plane 33 onto which the X-rays are projected will be located on the opposite side of the region of interest 26. The previous discussion also holds true in this case.

Figure 2:
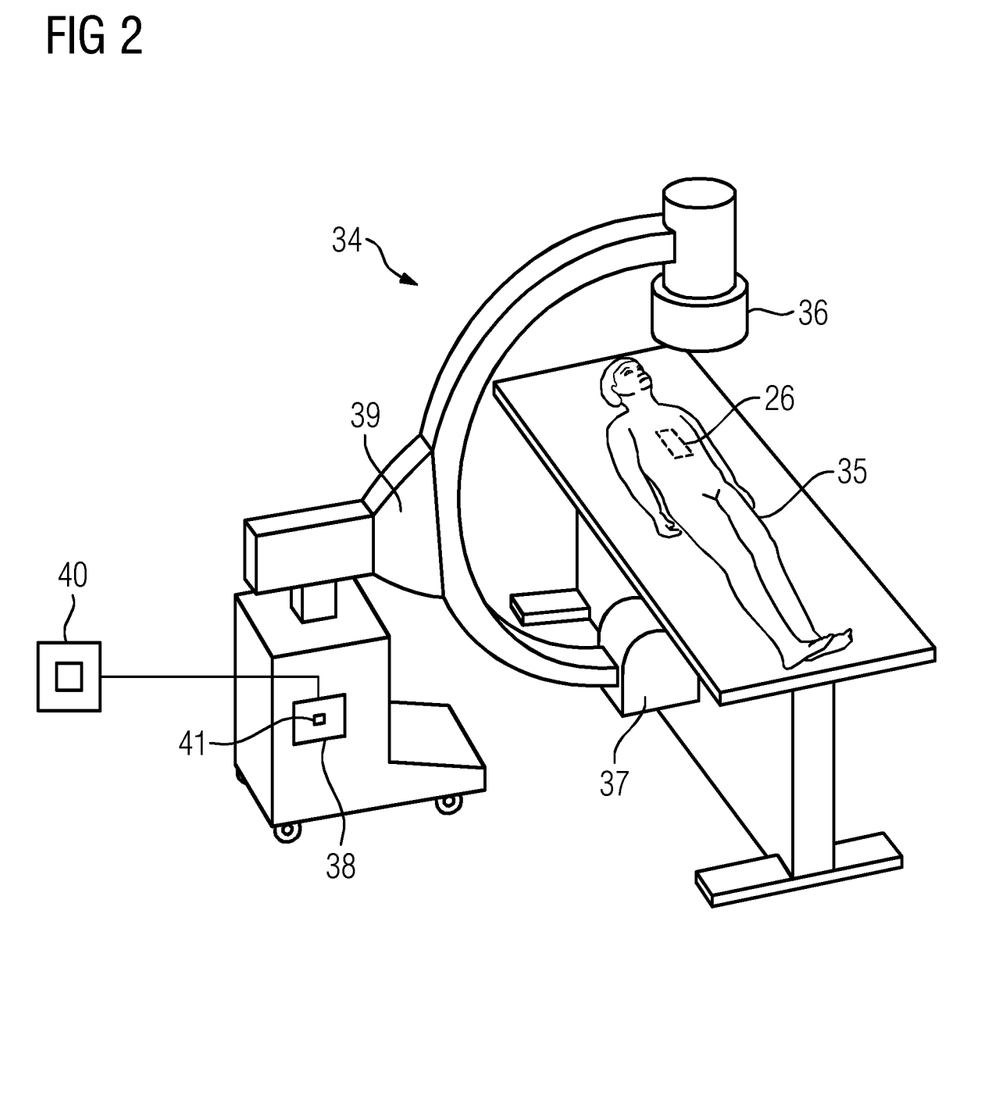
FIG. 2 shows an embodiment of a processing unit.

FIG. 2 shows one embodiment of an X-ray device 34 including an X-ray source 36, an X-ray detector 37, and a processing unit 38 (e.g., including one or more processors). The processing unit controls the C-arm 39, the X-ray source 36, and the detector 37 to acquire 2D images with different imaging geometries. For example, the C-arm 39 may oscillate between two acquisition angles and acquire a 2D image at each of the acquisition angles.

While 2D images of the region of interest 26 of a patient 35 are recorded, for example, during an image-guided interventional procedure, an overlay of at least one of these 2D images with an externally provided 3D image may be output to a display unit 40. To provide a proper registration of the 3D image to the 2D images, the previously discussed method may be implemented by the processing unit 38.

In an alternative embodiment, two or more pairs of X-ray sources and X-ray detectors may be used to simultaneously acquire 2D images in more than one imaging geometry.

The previously discussed method may be implemented by a computer program that may be directly loaded into a memory unit 41 of the processing unit 38. The computer program includes instructions for performing the previously discussed acts of the method for updating a registration between the 3D image and the 2D images. The program may be provided on a computer-readable storage medium that is not shown.

Although the present invention has been described in detail with reference to the exemplary embodiments, the present invention is not limited by the disclosed examples from which the skilled person is able to derive other variations without departing from the scope of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for determining or updating a registration between a three-dimensional (3D) image of a region of interest and a set of at least two two-dimensional (2D) images of the same region of interest, wherein the at least two 2D images are acquired using different imaging geometries, wherein the registration is described by a set of registration parameters, the method comprising:
    selecting at least one respective contour point in the 3D image for each of the at least two 2D images;
    determining a 2D position of a respective depiction of each contour point in the respective 2D image;
    for each contour point, determining at least one condition for registration parameters that needs to be fulfilled to map the respective contour point to the respective 2D position in the respective 2D image; and
    determining an updated set of registration parameters, the determining of the updated set of registration parameters comprising solving a set of equations or an optimization problem that depends on the conditions.

2. The method of claim 1, wherein the imaging geometries are defined or approximated by a respective central projection,
- wherein the registration parameters define a position and an orientation of the region of interest relative to a center of projection and to a plane of projection for each imaging geometry and therefore the 3D position of each contour point relative to the centers of projection and the planes of projection,
- wherein the 2D position of the depiction of the respective contour point defines the position of the depiction in the respective plane of projection, and
- wherein the at least one condition limits the possible 3D positions of the respective contour point to a respective bounding plane that comprises the center of projection for the imaging geometry of the respective 2D image and the position of the depiction of the respective contour point in the projection plane of that imaging geometry.

3. The method of claim 2, wherein an initial position and orientation of the 3D image relative to the centers of projection and the planes of projection are defined by an initial set of registration parameters,
- wherein a direction of a gradient of the 3D image at the respective 3D position of the contour point in the 3D image is determined, and
- wherein the bounding plane is orthogonal to the respective gradient.

4. The method of claim 1, wherein the conditions are conditions for the 3D positions of the contour points in a common coordinate system.

5. The method of claim 4, wherein determining the at least one condition comprises generating an initial condition for a 3D position of the respective contour point in an initial coordinate system and transforming the at least one condition to the common coordinate system.

6. The method of claim 5, wherein the initial coordinate system and the common coordinate system are defined by the imaging geometries for different 2D images.

7. The method of claim 4, wherein an origin of the common coordinate system is a geometric center of the 3D positions of the contour points.

8. The method of claim 1, wherein the registration parameters define a rigid rotation, translation, or rotation and translation of the region of interest with respect to a given frame of reference.

9. The method of claim 1, wherein at least one of the conditions depends on a relative rotation between an orientation of the region of interest according to the set of registration parameters or an initial set of registration parameters and according to the resulting set of registration parameters, and
- wherein a linear approximation for the relative rotation is used in the condition.

10. The method of claim 1, wherein at least one of the 2D images of the set is an X-ray image, wherein the 3D image is a magnetic resonance image or a computer tomography image, or a combination thereof.

11. The method of claim 1, wherein at least one prior set of prior 2D images is used,
- wherein the set of registration parameters or an initial set of registration parameters describes the registration of the 3D image to the prior 2D images, and
- wherein the set of registration parameters depends on the initial registration parameters and the prior 2D images.

12. The method of claim 1, wherein determining the 2D position of the respective depiction of each contour point depends on the registration parameters or an initial set of registration parameters, and
- wherein the determining of the 2D position of the respective depiction of each contour point is repeated with a resulting set of registration parameters to determine respective updated 2D positions for the depictions, and a further resulting set of registration parameters is determined in dependence of the updated 2D positions.

13. A processing unit comprising:
- a processor configured to determine or update a registration between a three-dimensional (3D) image of a region of interest and a set of at least two two-dimensional (2D) images of the same region of interest, wherein the at least two 2D images are acquired using different imaging geometries, wherein the registration is described by a set of registration parameters, the determination comprising:
  - selection of at least one respective contour point in the 3D image for each of the at least two 2D images;
  - determination of a 2D position of a respective depiction of each contour point in the respective 2D image;
  - for each contour point, determination of at least one condition for registration parameters that needs to be fulfilled to map the respective contour point to the respective 2D position in the respective 2D image; and
  - determination of an updated set of registration parameters, the determination of the updated set of registration parameters comprising solving a set of equations or an optimization problem that depends on the conditions.

14. The processing unit of claim 13, wherein the processing unit is a processing unit of an Xray device.

15. A non-transitory computer-readable storage medium storing instructions executable by one or more processor to determine or update a registration between a three-dimensional (3D) image of a region of interest and a set of at least two two-dimensional (2D) images of the same region of interest, wherein the at least two 2D images are acquired using different imaging geometries, and wherein the registration is described by a set of registration parameters, the instructions stored in the non-transitory computer-readable storage medium comprising:
- selecting at least one respective contour point in the 3D image for each of the at least two 2D images;
- determining a 2D position of a respective depiction of each contour point in the respective 2D image;
- for each contour point, determining at least one condition for registration parameters that needs to be fulfilled to map the respective contour point to the respective 2D position in the respective 2D image; and
- determining an updated set of registration parameters, the determining of the updated set of registration parameters comprising solving a set of equations or an optimization problem that depends on the conditions.

16. The non-transitory computer-readable storage medium of claim 15, wherein the imaging geometries are defined or approximated by a respective central projection,
- wherein the registration parameters define a position and an orientation of the region of interest relative to a center of projection and to a plane of projection for each imaging geometry and therefore the 3D position of each contour point relative to the centers of projection and the planes of projection, wherein the 2D position of the depiction of the respective contour point defines the position of the depiction in the respective plane of projection, and wherein the at least one condition limits the possible 3D positions of the respective contour point to a respective bounding plane that comprises the center of projection for the imaging geometry of the respective 2D image and the position of the depiction of the respective contour point in the projection plane of that imaging geometry.

17. The non-transitory computer-readable storage medium of claim 16, wherein an initial position and orientation of the 3D image relative to the centers of projection and the planes of projection are defined by an initial set of registration parameters, wherein a direction of a gradient of the 3D image at the respective 3D position of the contour point in the 3D image is determined, and wherein the bounding plane is orthogonal to the respective gradient.

18. The non-transitory computer-readable storage medium of claim 15, wherein the conditions are conditions for the 3D positions of the contour points in a common coordinate system.

* * * * *

UNITED STATES PATENT AND TRADEMARK OFFICE
CERTIFICATE OF CORRECTION

PATENT NO. : 10,832,421 B2
APPLICATION NO. : 15/998597
DATED : November 10, 2020
INVENTOR(S) : Anja Borsdorf et al.

Page 1 of 1

It is certified that error appears in the above-identified patent and that said Letters Patent is hereby corrected as shown below:

On the Title Page

Item (72) Inventors:
"Adesdorf (DE)"

Should be replaced with:
"Adelsdorf (DE)"

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*